United States Patent [19]

Hirama et al.

[11] Patent Number: 5,186,175
[45] Date of Patent: Feb. 16, 1993

[54] ULTRASONIC DIAGNOSTIC APPARATUS

[75] Inventors: Makoto Hirama; Takashi Kumazawa, both of Tochigi, Japan

[73] Assignee: Kabushiki Kaisha Toshiba, Kanagawa, Japan

[21] Appl. No.: 725,805

[22] Filed: Jul. 10, 1991

[30] Foreign Application Priority Data

Jul. 11, 1990 [JP] Japan .................................. 2-181544
Jul. 8, 1991 [JP] Japan .................................. 2-166638

[51] Int. Cl.$^5$ .............................................. A61B 8/12
[52] U.S. Cl. ........................... 128/661.01; 128/660.07; 73/861.25; 73/626
[58] Field of Search ...................... 128/660.07, 661.01, 128/662.03; 73/861.25, 861.31, 625, 626

[56] References Cited

U.S. PATENT DOCUMENTS

| | | | |
|---|---|---|---|
| 4,307,613 | 12/1981 | Fox | 128/661.01 |
| 4,570,488 | 2/1986 | Miwa et al. | 128/661.01 |
| 4,640,291 | 2/1987 | 't Hoen | 128/662.03 |
| 4,641,660 | 2/1987 | Bele | 128/661.01 |
| 4,653,000 | 3/1987 | Matsumoto | 364/414 |
| 4,674,516 | 6/1987 | Hirota et al. | 128/661.01 |
| 4,821,574 | 4/1989 | Takamizawa | 128/661.01 |
| 4,862,892 | 9/1989 | Green | 128/660.07 |
| 4,873,985 | 10/1989 | Nakajima | 128/660.05 |
| 4,945,915 | 8/1990 | Nagasaki | 128/661.01 |
| 5,060,651 | 10/1991 | Kondo et al. | 128/661.01 |

Primary Examiner—Kyle L. Howell
Assistant Examiner—George Manuel
Attorney, Agent, or Firm—Finnegan, Henderson, Farabow, Garrett and Dunner

[57] ABSTRACT

In an ultrasonic diagnostic apparatus in which ultrasonic echo beams is focused three-dimensionally, a probe employs plural transducers arranged in two directions, lateral and azimuth directions. The transducers arranged in each azimuth direction are connected to a transmitting-receiving channel in a transmitting-receiving portion via a switch circuit. The switch circuit operates on the control of a switching controller and can connect a transducer selected by the controller in the azimuth direction to the transmitting-receiving channel. Output signals from the transmitting-receiving portion are supplied to a signal processing portion, in which beam forming for three-dimension echo beams is carried out by using a beam former. Thus, transducers arranged on each line in the lateral direction can be driven simultaneously, resulting in a more compact circuit and a reduced number of transmitting and receiving for better real-time processing. Further, the beam former is devided into two stage, one for the lateral direction and the other for the azimuth direction. This combination of two beam formers lead to adjustable focuses in the both direction in addition to a reduced memory capacity in the signal processing.

12 Claims, 12 Drawing Sheets

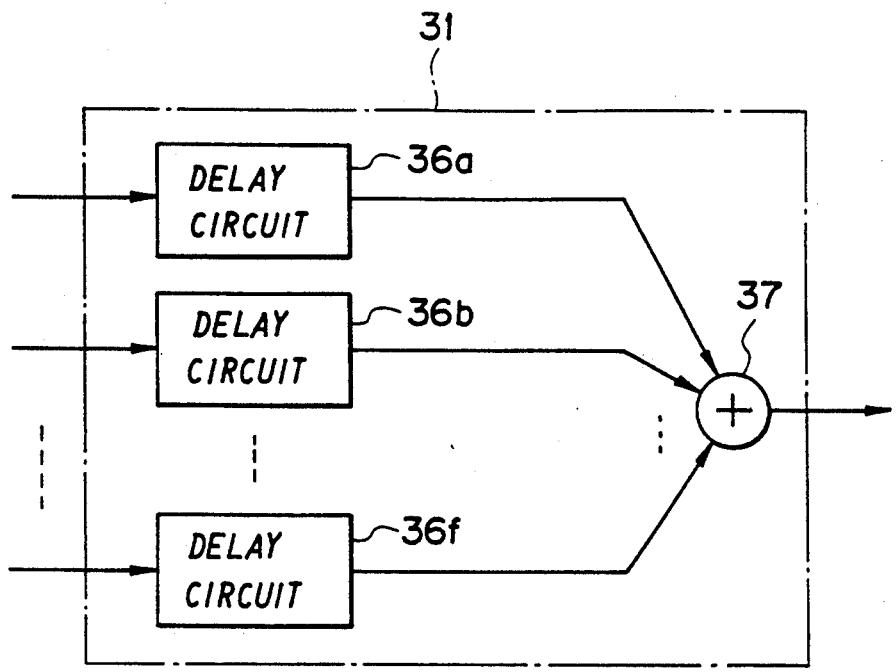
FIG. 6
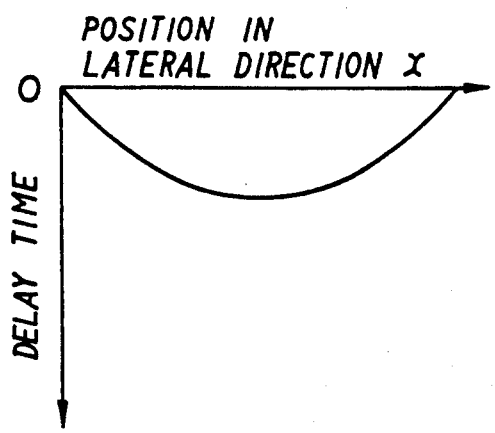 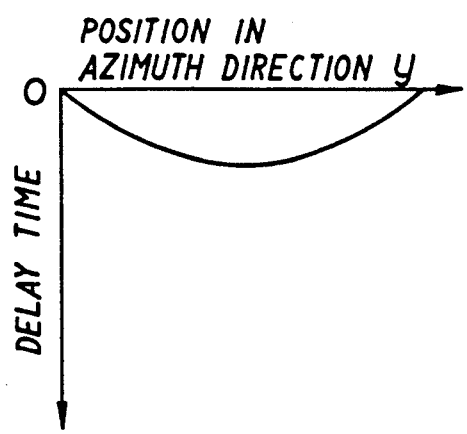
FIG. 7A  FIG. 7B

ULTRASONIC DIAGNOSTIC APPARATUS

BACKGROUND OF THE INVENTION

1. Field of the Invention

The present invention relates to an ultrasonic diagnostic apparatus, and, more particularly, to an ultrasonic diagnostic apparatus which employs a probe formed into a two-dimensional array structure in which small piezoelectric transducers (hereinafter abbreviated to "transducers") are arranged in a lateral direction (scanning direction) and an azimuth direction for transmitting and receiving ultrasonic wave to and from a subject to be diagnosed.

2. Description of Related Art

Hitherto, a variety of ultrasonic probes (hereinafter abbreviated to "probes") of an ultrasonic diagnostic apparatus have been used to meet the object of the diagnosing operation and the scanning performance.

A probe arranged to perform the scanning operation in a specific direction is formed into a one-dimensional array structure in which a plurality of transducers having the same characteristics are arranged in the lateral direction. When a probe of the above-described type is driven in a linear electronic scanning manner, a plurality of the transducers in the probe are used to form a set to be driven simultaneously. By making, at the above-described driving operation, the driving timing to be different between the transducer positioned at the center in the scanning direction and the transducer disposed in the lateral direction from the central tranducer, the phase difference in the generated soundwave of the transducer can be utilized. As a result, ultrasonic beams converged (focused) in the direction of the subject (such as a human body) to be diagnosed, which is perpendicular to the central portion of the transducer group, can be formed. Accordingly, the ultrasonic beam transmitting position can be sequentially electronically shifted in the lateral direction x by driving the overall portion of a plurality of the transducers to be driven while shifting the overall portion by, for example, a distance corresponding to one transducer in the lateral direction x. Thus, the linear scanning can be performed. At the time of receiving the signals, the transducer, which has transmitted the signal, receives the ultrasonic echo signal to convert it into a voltage signal. The voltage signal obtained by the above-described conversion is transmitted to a receiving circuit so as to be reconstructed into an ultrasonic image data before it is displayed on a display such as a TV monitor.

According to a sector method, the driving timing of each of the transducers is changed in such a manner that the ultrasonic beam scanning direction is sequentially changed into a sector shape at each pulse. As a result, the ultrasonic image formed in accordance with the sector method can be displayed on a display after the operations similar to those performed in accordance with the linear method have been performed.

However, the above-described method in which the probe formed into the one-dimensional array structure is used encounters a problem in that the ultrasonic beam is able to scan only the lateral direction x, which is the direction in which the transducers are arranged, that is, only the one-dimensional direction.

Accordingly, a probe formed into a two-dimensional array structure has been developed the scanning direction of which is not limited to the one dimensional direction but is capable of two-dimensionally controlling the scanning direction in the azimuth direction which is perpendicular to the lateral direction as well as the conventionally realized lateral direction x. The probe formed into the two-dimensional array structure is arranged in such a manner that a plurality of the transducers are furthermore arranged in the azimuth direction which is perpendicular to the lateral direction in addition to the transducers arranged in the lateral direction.

In order to drive the probe formed into the two-dimensional array structure to generate the ultrasonic beams to be received in both the lateral direction and the azimuth direction, it might be considered feasible to employ a structure arranged in such a manner that switches are respectively disposed between all of the transducers and the transmitting-receiving portion so as to be sequentially switched to obtain data.

The azimuth directional beam forming can also be performed by using a known acoustic lens.

However, there arise problems in the case where the transmitting-receiving circuits must be respectively provided for a plurality of the transducers which form the two-dimensional array, the overall size of the transmitting-receiving circuit is enlarged excessively, resulting in deteriorated practicality, and the required quantity of calculations is increased and thereby the real time responsibility deteriorates. Furthermore, the structure in which the acoustic lens is employed suffers from a problem in that the directivity for the azimuth direction is previously determined and the focal point for the azimuth direction cannot further be changed as desired.

SUMMARY OF THE INVENTION

Accordingly, it is an object of the present invention to provide an ultrasonic diagnostic apparatus in which the overall size of the transmitting/receiving circuit is not enlarged excessively when the two-dimensional array type probe is employed.

It is another object of the present invention to provide an ultrasonic diagnostic apparatus in which the overall size of the transmitting/receiving circuit is not enlarged excessively and the real time responsibility is maintained higher when the two-dimensional array type probe is employed.

It is a further object of the present invention to provide an ultrasonic diagnostic apparatus in which the directivity for the azimuth direction as well as the lateral direction can be changed as desired.

These and other objects can be achieved according to the present invention, in one aspect by providing, an ultrasonic diagnostic apparatus comprises a probe including a plurality of transducers capable of, in two directions, converting electric signals and the ultrasonic signals and arranged two dimensionally in a lateral direction and an azimuth direction; signal transmitting-receiving means capable of transmitting electric signals for exciting the transducers of the probe and receiving the electric signals converted by the transducers; switch command means for dividing all of the transducers of the probe into a plurality of groups and commanding to switch the transducers for each of the divided groups; switch means for electrically connecting a transducer group commanded by the switch command means to the signal transmitting-receiving means: storage means for storing the electric signals corresponding to the ultrasonic echo signals for all of the transducers obtained by the signal transmitting-receiving means; calculating means for delaying data stored in the storage means to calculate the data in order to converge the ultrasonic echo signals onto a position to be diagnosed in the subject; and display means for displaying the ultrasonic image in accordance with the result of a calculation performed by the calculating means.

In this preferred embodiment, the switch command means commands a plurality of the transducers arranged on a lateral directional line of the probe as one group. The switch means includes switch circuits the number of which is the same as that of the transducers arranged on the lateral directional line of the probe.

In another aspect according to the present invention, there is also provided an ultrasonic diagnostic apparatus comprises a probe including a plurality of transducers capable of, in two ways, converting electric signals and ultrasonic signals and arranged two dimensionally in a lateral direction and a azimuth direction; signal transmitting-receiving means capable of transmitting electric signals for exciting the transducers of the probe and receiving the electric signals converted by the transducers; switch command means for previously dividing all of the transducers of the probe into lines in a lateral direction or an azimuth direction and commanding to switch the transducers for each of the division lines; switch means for electrically connecting transducers on a line commanded by the switch command means to the signal transmitting-receiving means; first calculating means for delaying electric signal groups simultaneously obtained by the signal transmitting-receiving means to add the signals in order to converge the ultrasonic echo signals along a plane including a position to be diagnosed in the subject as a focal point and perpendicular to either one of the lateral direction and the azimuth direction; storage means for storing a result of a calculation performed by the first calculating means; second calculating means for delaying data group stored in the storage means to add the data in order to converge the ultrasonic echo signals along a plane including the position to be diagnosed in the subject as the focal point and perpendicular to another one of the lateral direction and the azimuth direction; and display means for displaying said ultrasonic image in accordance with a result of a calculation performed by the calculating means.

In this preferred embodiment, the position to be diagnosed is composed of a single position and each of the first and second calculating means includes a delay circuit for delaying a plurality of input signals in accordance with a single delay pattern which corresponds to the single diagnostic position. Further, the position to be diagnosed is composed of plural positions and at least either one of the first calculating means and second calculating means includes a delay circuit for delaying an input signal group respectively in accordance with plural delay patterns which correspond to the plural diagnostic positions and an adder for adding delay signals transmitted from the delay circuit.

In another aspect according to the present invention, there is also provided an ultrasonic diagnostic apparatus that further comprises depth signal generating means for generating a depth signal to be measured which varies with measuring time; and at least one of the first calculating means and seond calculating means includes a delay circuit for delaying plural input signals in accordance with a delay pattern which changes with the depth signal from the depth signal generating means. It is also preferred that at least one of the first calculating means and second calculating means includes a delay circuit for delaying plural input signals in accordance with a delay pattern which changes with the depth signal from the depth signal generating means and includes a weighting circuit for weighting plural output signals from the delay circuit respectively in accordance with a weighting coefficient pattern which changes with the depth signal from the depth signal generating means.

BRIEF DESCRIPTION OF THE DRAWINGS

The accompanying drawings which are incorporated in and constitute a part of this specification, illustrate embodiments of the invention and, together with the description, serve to explain the principles of the invention. In the drawings:

FIG. 6 is a schematic block diagram of a beam former;

FIG. 7A represents a delay time pattern in a lateral direction for a single diagnostic position;

FIG. 7B represents a delay time pattern in a azimuth direction for a single diagnostic position;

DESCRIPTION OF THE PREFERRED EMBODIMENTS

Preferred embodiments of the present invention will now be described with reference to the drawings.

A first embodiment of the present invention will now be described with reference to FIGS. 1 to 4, in which ultrasonic beams to be received are formed while making single diagnostic position α to be the focal point.

Figure 1:
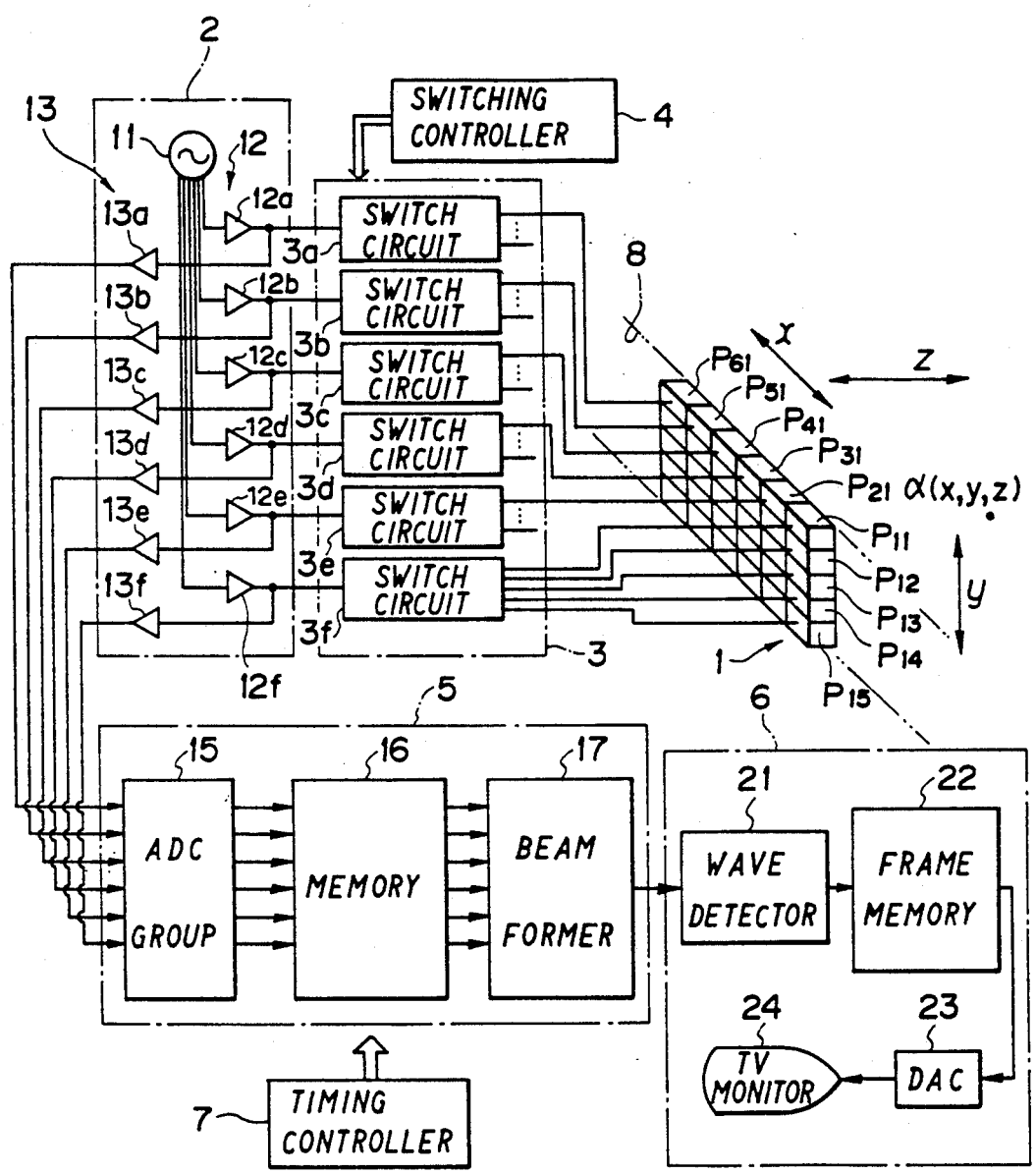
FIG. 1 is a schematic block diagram of an ultrasonic diagnostic apparatus according to a first preferred embodiment of the present invention.

An ultrasonic diagnostic apparatus shown in FIG. 1 comprises a probe 1 formed into a two-dimensional array structure and a transmitting-receiving portion 2 for transmitting and receiving an ultrasonic signal via the probe 1, the transmitting-receiving portion 2 serving as a signal transmitting-receiving means. The ultrasonic diagnostic apparatus further comprises a switch circuit group 3 capable of switching on/off the connection between the above-described transmitting-receiving portion 2 and the probe 1 and a switching controller 4 for commanding the switch circuit group 3 to switch on/off the above-described connection, the switch circuit group 3 serving as a switch means and the switching controller 4 serving as a switching command means. The ultrasonic diagnostic apparatus further comprises a signal processing portion 5 for forming an echo data from a signal to be received and issued from the transmitting-receiving portion 2 and a display portion 6 for displaying data processed by the signal processing portion 5. Referring to the FIG. 1, reference numeral 7 represents a timing controller for controlling the operational timing of the overall system and 8 represents a subject to be diagnosed. A depth direction in the subject 8 is expressed as a reference symbol z.

The probe 1 has a plurality of piezoelectric elements capable of converting a voltage signal and the ultrasonic signal into two ways, the piezoelectric elements serving as transducers. The probe I comprises a plurality of transducers $P_{1y}$, $P_{2y}$, $P_{3y}$, $P_{4y}$, $P_{5y}$ and $P_{6y}$ ($y=1$ to 5) arranged in a lateral direction (that is, a scanning direction) x and having the same characteristics and a plurality of transducers $P_{x1}$, $P_{x2}$, $P_{x3}$, $P_{x4}$ and $P_{x5}$ ($x=1$ to 6) arranged in an azimuth direction y and having the same characteristics, the azimuth direction y being perpendicular to the lateral direction x. Thus, the two-dimensional array is constituted.

The transmitting-receiving portion 2 comprises a reference signal generating source 11, a pulser group 12 and a preamplifier group 13. The reference signal generating source 11 has an output circuit of n channels (6 channels according to this embodiment). The output terminals of the n-channel output circuit are connected to pulsers 12a, . . . , 12f of the pulser group 12. The pulsers 12a, . . . , 12f amplify a reference pulse signal transmitted from the reference signal generating source 11. The output terminals of the pulsers 12a, . . . , 12f are connected to either of I/O terminals of corresponding switch circuits 3a, . . . , 3f of the switch circuit group 3, while the I/O terminals are also connected to the preamplifiers 13a, . . . , 13f of the preamplifier group 13.

Figure 2:
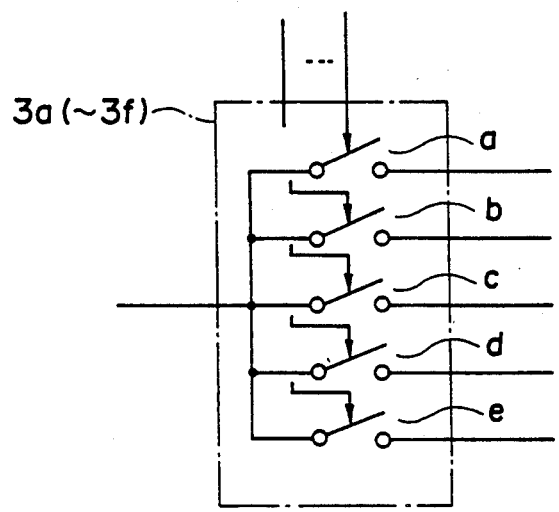
FIG. 2 is a circuit diagram of a switch circuit.

As shown in FIG. 2, the switch circuits 3a, . . . , 3f respectively include m switching elements a, . . . , e, m (five according to this embodiment) being the same number as the number of the transducers of the probe 1 arranged in the azimuth direction y. The above-described switching elements a, . . . , e are MOS type field effect transistors. Either of the terminals of the switching elements a, . . . , e, connected in parallel, are respectively connected to the output terminals of the above-described pulsers 12a (, . . . , 12f), while the other terminals are respectively connected to the transducers $P_{x1}$, . . . , $P_{x5}$ of the corresponding azimuth direction y. Each of the switch circuits 3a, . . . , 3f is supplied with a switch signal from the switching controller 4 at a predetermined timing. As a result, the switching elements a, . . . , e are selectively switched on in response to the switch signals. The switching controller 4 comprises, for example, a computer and controls the switching action performed by the switch circuits 3a, . . . , 3f.

The signal processing portion 5, as illustrated, comprises, an A/D converter group 15, a memory 16 and a beam former 17. The A/D converter group 15 and the memory 16 constitute a storage means according to the present invention, while the beam former 17 constitutes a processing means. The A/D converter group 15 converts analog output signals transmitted from the preamplifiers 13a, . . . , 13f into digital signals so as to transmit them to the memory 16. The memory 16 temporarily stores the digital signals supplied from the A/D converter group 15 for a predetermined time for all of the transducers. The beam former 17, for example, comprises a digital processing circuit to read out data stored in the memory 16 at a predetermined timing. It performs beam forming of delaying time corresponding to traveling time from the focal point and all of the transducers $P_{11}$, $P_{21}$, . . . , $P_{55}$ and $P_{65}$, the focal point being diagnostic position α in the subject 8 to be diagnosed, the beam forming operation comprising a delaying operation and an addition operation.

The display portion 6 serves as a image producing means according to the present invention and comprises a wave detecting circuit 21, a frame memory 22, a D/A converter 23 and a TV monitor 24. The wave detecting circuit 21 detects a high frequency signal which is as it is in the form of the digital signal so as to cause the signal thus-detected to be stored by the frame memory 22. Data stored in the frame memory 22 is read out at the display timing of the TV monitor 24 before it is converted into an analog signal by the D/A converter 23. The signal thus-converted is supplied to and displayed by the TV monitor 24.

Then, the operation of the first embodiment of the present invention will now be described with reference to FIG. 3.

The reference pulse signal transmitted from the reference signal generating source 11 is amplified by each of the pulsers 12a, . . . , 12f before it is transmitted to the probe 1 via the switch circuits 3a, . . . , 3f. An assumption is, at this time, made that a switching element of each of the switch circuits 3a, . . . , 3f is switched on for a predetermined time T (see FIG. 3 (a1)) by, for example, the switching controller 4. As a result, the output signals from the pulsers 12a, . . . , 12f pass through the switching elements a, . . . , a of the switching circuits 3a, . . . , 3f to simultaneously excite the transducers $P_{11}$, $P_{21}$, $P_{31}$, $P_{41}$, $P_{51}$ and $P_{61}$ on the first line in the lateral direction x (see FIG. 3 (a2)). As a result, ultrasonic signals are transmitted from the transducers $P_{11}$, . . . , $P_{61}$ to the subject 8 to be diagnosed. The beam thus transmitted includes diagnostic position α while expanded to a certain degree.

Figure 3:
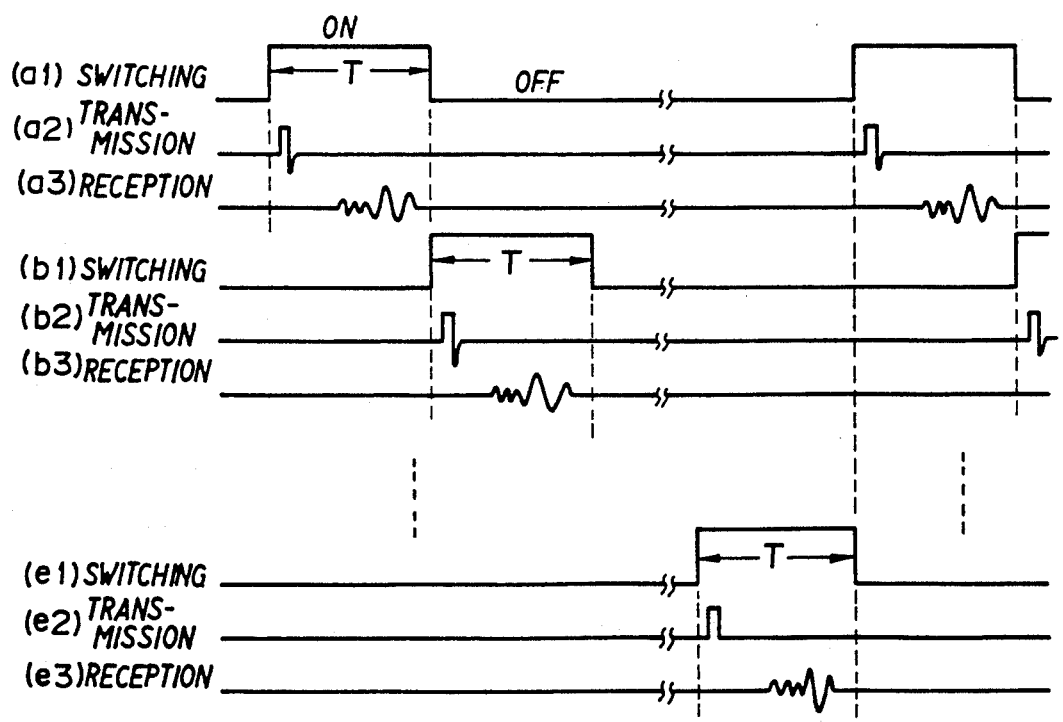
FIG. 3 is a timing chart representing transmission and reception of each transducer group arranged in a lateral direction.

On the other hand, the ultrasonic signal reflected in the subject 8 to be diagnosed returns to the probe 1 and an ultrasonic echo signal is converted into a voltage signal by each of the transducers $P_{11}$, . . . , $P_{61}$ (see FIG. 3 (a3)). However, since only the switching elements a, . . , a of each of the switch circuits 3a, . . . , 3f are switched on in this state, only the signals denoting the voltage level of the transducers $P_{11}$, . . . , $P_{61}$ on the first line in the lateral direction x are fetched by the transmitting-receiving portion 2 before they are individually amplified by the preamplifiers 13a, . . . , 13f. The echo signals thus-amplified are respectively converted into the digital signals by the A/D converter group 15 in the signal processing portion 5 before they are stored in predetermined regions in the memory 16.

After a conductive time T allowed for the transducers in the first line has passed, the switching controller 4 simultaneously switches on only switching elements b, ..., b of the switch circuits $3a, ..., 3f$ for time T (see FIG. 3 (b1)). As a result, the transducers $P_{12}, ..., P_{62}$ on the second line in the lateral direction x are simultaneously excited (see FIG. 3 (b2)) so that the echo signals are received through the above-described transducers $P_{12}, ..., P_{62}$ (see FIG. 3 (b3)).

Figure 4:
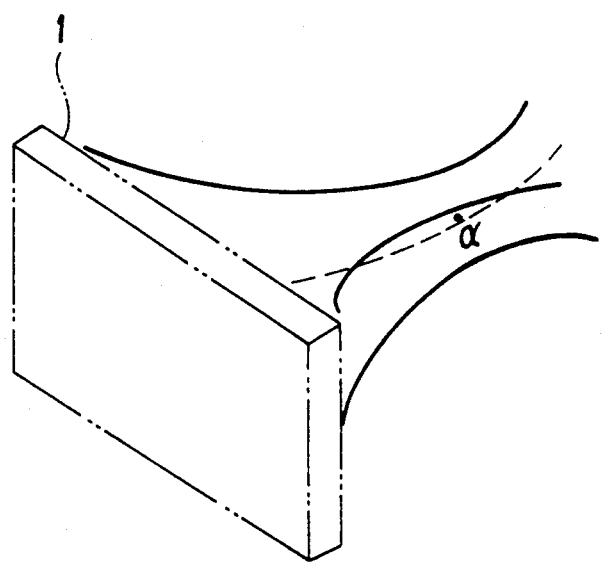
FIG. 4 represents a pictorial three-dimensional form of a receiving beam.

Then, operations similar to the above-described operations are repeated to the transducers $P_{15}, ..., P_{65}$ on the fifth line in the lateral direction x. As a result, the beam former 17 in the signal processing portion 5 reads out data stored in the memory 16 so as to perform the beam forming while making the single diagnostic position $\alpha$ to be the focal position. That is, in order to cause the received beams to be converged onto the focal point $\alpha$, as shown in FIG. 4, by the calculations performed after the signal receipt, each of data items is delayed before they are added. The result of the addition thus-obtained is image data at a certain time at the diagnostic position $\alpha$, the image data being read out at a predetermined timing so as to be displayed on the TV monitor 24 after the data has been stored in the frame memory 22 via the wave detector 21 of the display portion 6.

When all of the transducers $P_{11}, ..., P_{66}$ of the probe 1 have been driven as described above, the switching controller 4 proceeds to the next drive cycle so as to again drive the transducers $P_{11}, ..., P_{61}$ on the first line in the lateral direction x. As a result, the above-described operation is repeated.

By dividing all of the transducers $P_{11}, ..., P_{65}$ of the probe 1 while making those on a line in the lateral direction x to be a unit group and by driving each of the groups, the number of the transmitting-receiving channels of the transmitting-receiving portion 2 may be provided by the number of the transducers in the lateral direction x. As a result, even if the probe 1 formed into the two-dimensional array structure is driven, the size of the overall structure can be reduced substantially, as compared with an apparatus in which transmitting-receiving channels for all the transducers are provided.

When the above-mentioned embodiment is applied to diagnosis by obtaining a doppler image, a measuring position is fixed to one point or thickened slicing for scanning is not necessary. In this measurement, an acoustic lens making convergence in the azimuth direction y is placed on the side facing the subject 8, of the probe 1, and the beam former 17 is designed to making the beam converge only in the lateral direction x. Further, the switching controller 4, for example, will operate to switch on the switching elements $a, ..., e$ of the switch circuits $3a, ..., 3f$ simultaneously, then exiting all transducers $P_{11}, ..., P_{65}$. As a result, all acoustic energy irradiated from the transducers $P_{11}, ..., P_{65}$ can concentrate on a desired measuring position and reflecting energy of echo signals become strengthened, resulting in higher signal-to-noise (S/N) ratios.

In the first embodiment, a delay technique may also be applied to transmission of ultrasonic beams. To accomplish it, the apparatus should have structure in which delay circuits are placed between the reference signal generating source 11 and the pulser $12a, ..., 12f$ respectively and the delay time pattern of the delay circuits is designed so that transmitting ultrasonic signals converge along a plane perpendicular to the lateral direction x and including a diagnostic position $\alpha$. This structure produces increased ultrasonic energy reflecting from the diagnostic position $\alpha$ and results in reduced side lobes, namely, higher signal-to-noise ratios.

A second embodiment of the present invention will now be described with reference to FIGS. 5 to 9. The second embodiment is arranged in such a manner that the beam forming subjected to the single diagnostic position $\alpha$ is performed in the lateral direction x and the azimuth direction y, respectively. According to FIGS. 5 to 9, the same elements as those according to the first embodiment are given the same reference numerals and their descriptions are omitted or simplified here.

Figure 5:
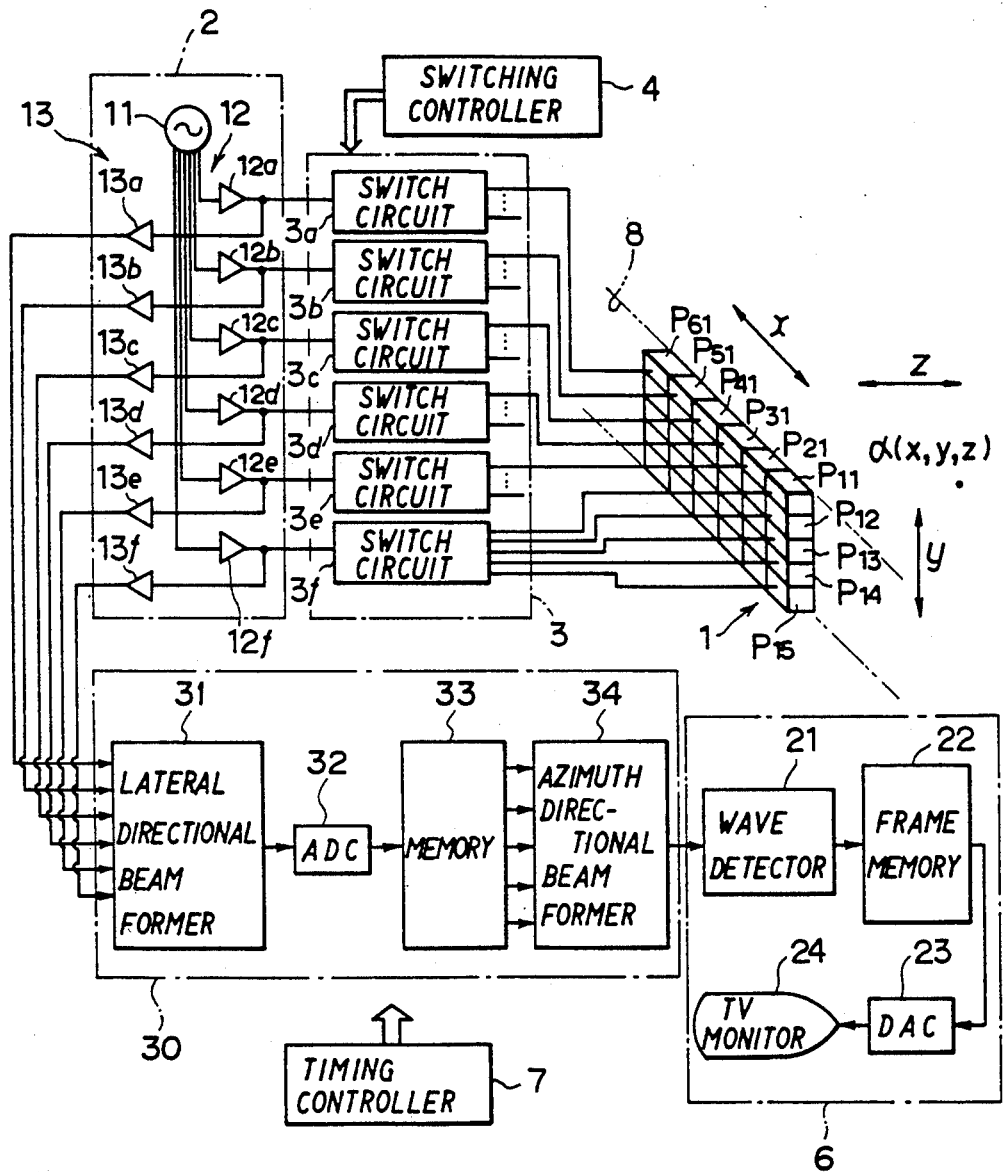
FIG. 5 is a schematic block diagram of an ultrasonic diagnostic apparatus according to a second embodiment of the present invention.

A signal processing portion 30 of the ultrasonic diagnosing apparatus shown in FIG. 5 has, on its input side, a lateral-directional beam former 31 serving as a first processing means while having, on its output side, an A/D converter 32, a memory 33 and an azimuth beam former 34 serving as a second processing means. That s, the beam former 17 according to the first embodiment is sectioned into two portions formed in the lateral direction x and the azimuth direction y. The A/D converter 32 and the memory 33 composes a storage means.

Figure 8A:
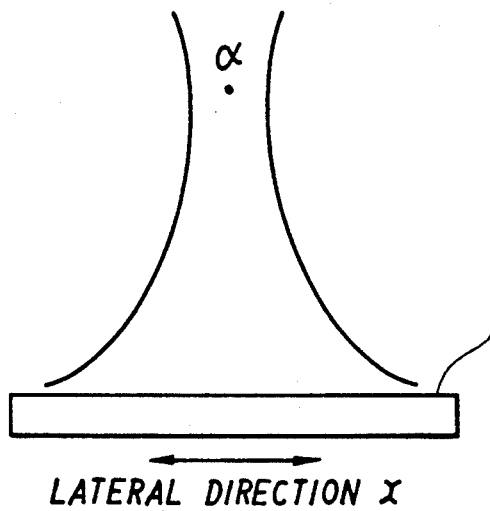
FIG. 8A represents a form of a receiving beam in a lateral direction.
Figure 8B:
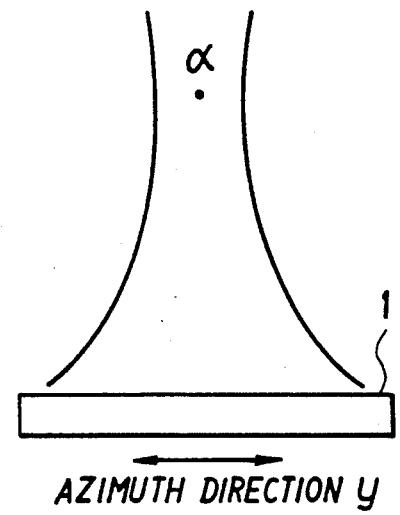
FIG. 8B represents a form of a receiving beam in a azimuth direction.

As shown in FIG. 6, the lateral directional beam former 31 comprises a set of (six) delay circuits $36a, ..., 36f$ for respectively receiving output signals from the preamplifiers $13a, ..., 13f$ of the transmitting-receiving portion 2 and an adder 37 for adding the output signals from the above-described delay circuits $36a, ..., 36f$ to supply the result of this addition to the A/D converter 32. The delay times of the delay circuits $36a, ..., 36f$ are respectively set to values designated by points on a curve shown in FIG. 7A. As a result, ultrasonic beams of the transducers $P_{1y}, P_{2y}, P_{3y}, P_{4y}, P_{5y}, P_{6y}$ (y=1 to 5) have, as shown in FIG. 8A, a directivity along a plane which is perpendicular to the lateral direcction x and including the diagnostic position $\alpha$ in terms of performing a calculation.

Figure 9:
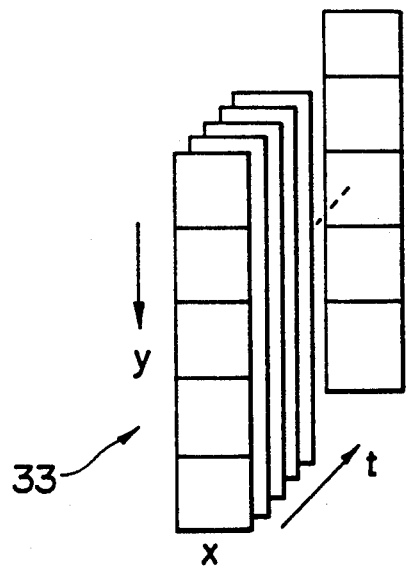
FIG. 9 shows a pictorial structure of a memory.

As shown in FIG. 9, the memory 33 comprises a three dimensional matrix in the size of one column in the lateral direction x, five rows in the azimuth direction y and scanning time t for a single diagnostic position $\alpha$ so that it is able to store data in each direction.

The azimuth directional beam former 34 realizes a circuit structure equivalent to that shown in FIG. 6 by a digital processing circuit. That is, the delay time of each of delay circuits is set on a predetermined point on a curve shown in FIG. 7B while having a directivity (see FIG. 8B) along a plane which is perpendicular to the azimuth direction y and including the diagnostic position $\alpha$ in terms of performing the calculation.

The other structures and the operation are the same as those according to the first embodiment.

In the ultrasonic diagnostic apparatus according to this embodiment, when the received signal transmitted from each of the transducers $P_{1y}, ..., P_{6y}$ (y=1 to 5) in the lateral direction x of the probe 1 is transmitted from the transmitting-receiving portion 2, the signals received are first delayed by the lateral directional beam former 31 by different degrees so as to be added. As a result, in terms of the calculations, the ultrasonic beam of each line of the transducers $P_{1y}, ..., P_{6y}$ is diaphragmed in the lateral direction x while making the diagnostic position $\alpha$ to be the focal point so that image data at the diagnostic position $\alpha$ is calculated. The image data is converted from the analog signal into the digital signal by the A/D converter 32 before it is stored at the first position of the memory 33. The above-described operation is repeated for each line of the transducers $P_{1y}, \ldots, P_{6y}$ until scanning of one cycle is completed. As a result, one column of the memory 33 is filled with data. The stored data for one column is then collectively read out by the azimuth directional beam former 34 so as to be delayed and added in the form of digital data. That is, ultrasonic beams, which have been first diaphragmed by the lateral directional beam former 31 while making the diagnostic position $\alpha$ to be the focal point, are then added in terms of the calculation so as to be diaphragmed in the azimuth direction y. As a result, the beam corresponding to the result of the calculation performed by the azimuth directional beam former 34 is formed into the three-dimensional shape while making the diagnostic position $\alpha$ to be the focal point similarly to the case shown in FIG. 4. Therefore, the echo data about the diagnostic position $\alpha$ can be obtained at a high S/N ratio, the echo data thus-obtained being transmitted to the display portion 6.

As described above, by scanning each line of the transducers in the lateral direction x and by performing a synthetic aperture in the azimuth direction y, the capacity of the memory 33 can be reduced noticeably.

By changing the delay time pattern of each of the beam former 31 and 34, the diagnostic position, that is, the focal position of the ultrasonic beam to be received can be set at a desired depth and angle from the surface of the subject 8 to be diagnosed.

A third embodiment of the present invention will now be described with reference to FIG. 10. The third embodiment is arranged in such a manner that the position to be diagnosed in the azimuth direction y is always made to be the central position, that is, the azimuth direction y is not subjected to the adjustable beam forming. The same elements as those according to the second embodiments are given the same reference numerals and their descriptions are simplified or omitted here.

Figure 10:
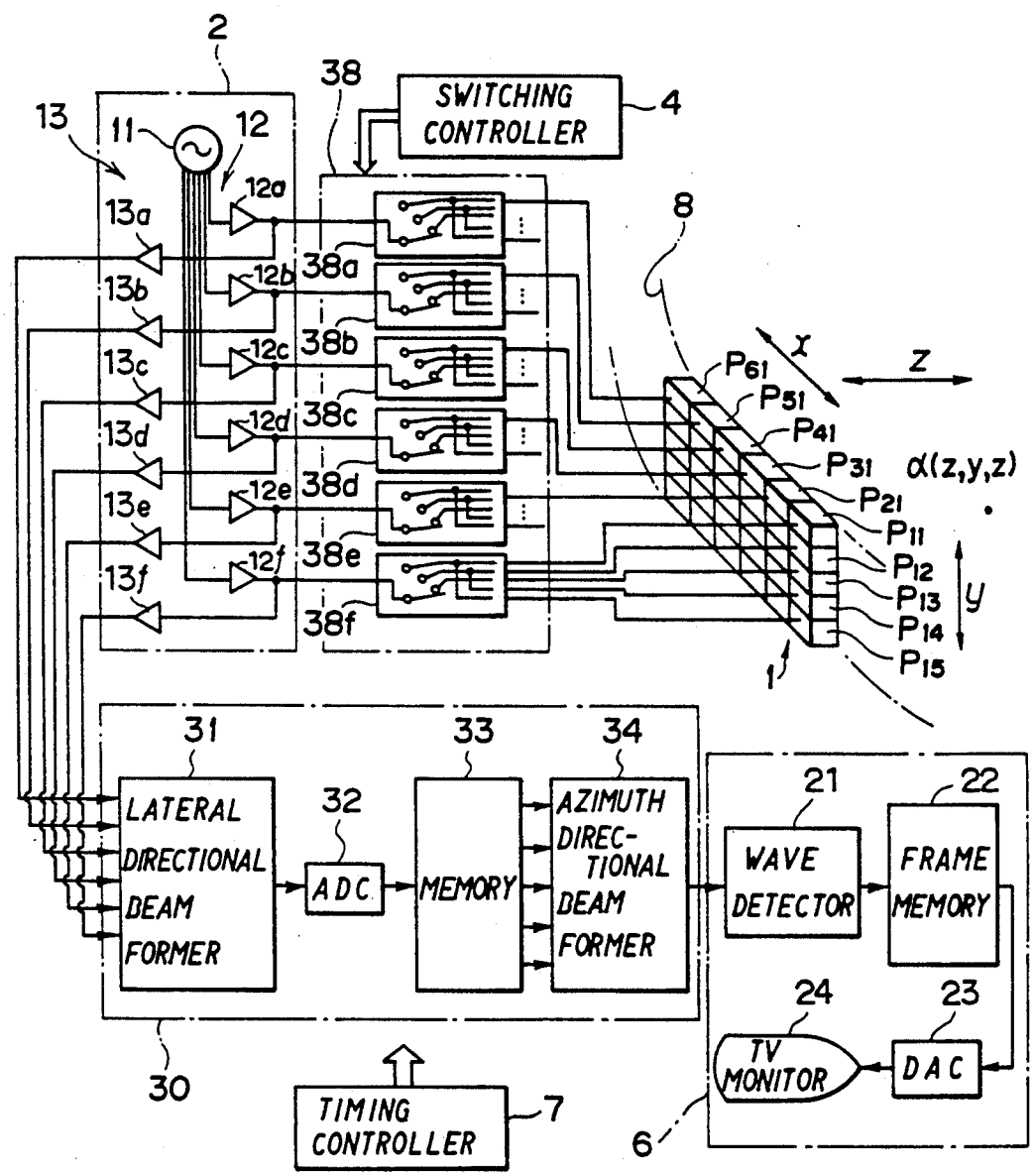
FIG. 10 is a schematic block diagram of an ultrasonic diagnostic apparatus according to a third embodiment of the present invention.

Accordingly, the switch circuits 38a, ..., 38f of the switch group 38, serving as a switch means, are connected as shown in FIG. 10. That is, three terminals of each of the switch circuits 38a (, ..., 38f) are formed adjacent to the probe 1 so as to be selectively connected to a common terminal adjacent to the transmitting-receiving portion 2. The central transducer $P_{x3}$ of a plurality of odd numbers of the transducers $P_{x1}, P_{x2}, P_{x3}, P_{x4}, P_{x5}$ (x=1 to 6) is solely pulled out. Furthermore, the transducers $P_{x2}$ and $P_{x4}$ are connected in series, and the transducers $P_{x1}$ and $P_{x5}$ respectively disposed adjacent to the transducer $P_{x2}$ and $P_{x4}$ are connected in series. In addition, their three pulled-out terminals are connected to the three I/O terminals of the switch circuit. The azimuth directional beam former 34 of the signal processing portion 30 according to the third embodiment employs a delay time pattern in which beams are converged at the y-directional central position. The other structures are the same as those according to the second embodiment of the present invention.

Thus, scanning for each transducer in the lateral direction x is performed similarly to each of the above-described embodiments. Therefore, when the transducers $P_{1y}, \ldots, P_{6y}$ on the first line (y=1) are driven, the transducers $P_{1y}, \ldots, P_{6y}$ on the fifth line (y=5) are simultaneously driven. When the transducers $P_{1y}, \ldots, P_{6y}$ on the second line (y=2) are driven, the transducers $P_{1y}, \ldots, P_{6y}$ on the fourth line (y=4) are simultaneously driven. As a result, the three-dimensional received beams can be converted in such a manner that they are arbitrarily converged in the lateral direction x and they can be always converged at the determined central position in the azimuth direction y. According to this embodiment, the total number of the times at which the ultrasonic waves are transmitted and received can be reduced to 3/5 in comparison with each of the above-described embodiments. Therefore, an excellent real time responsibility can be obtained.

A fourth embodiment of the present invention will now be described with reference to FIGS. 11 to 14. The fourth embodiment is arranged in such a manner that the beam forming of an arbitrary slice plane in the subject to be diagnosed, that is, two dimensional diagnostic position $\alpha_{xy}$ (according to this embodiment, an assumption of (x=3, y=2) is made), is performed while sectioning it into the lateral direction x and the azimuth direction y. Referring to FIGS. 11 to 14, the same reference numerals as those according to the above-described first embodiment are given the same reference numerals and their descriptions are simplified or omitted here.

Figure 11:
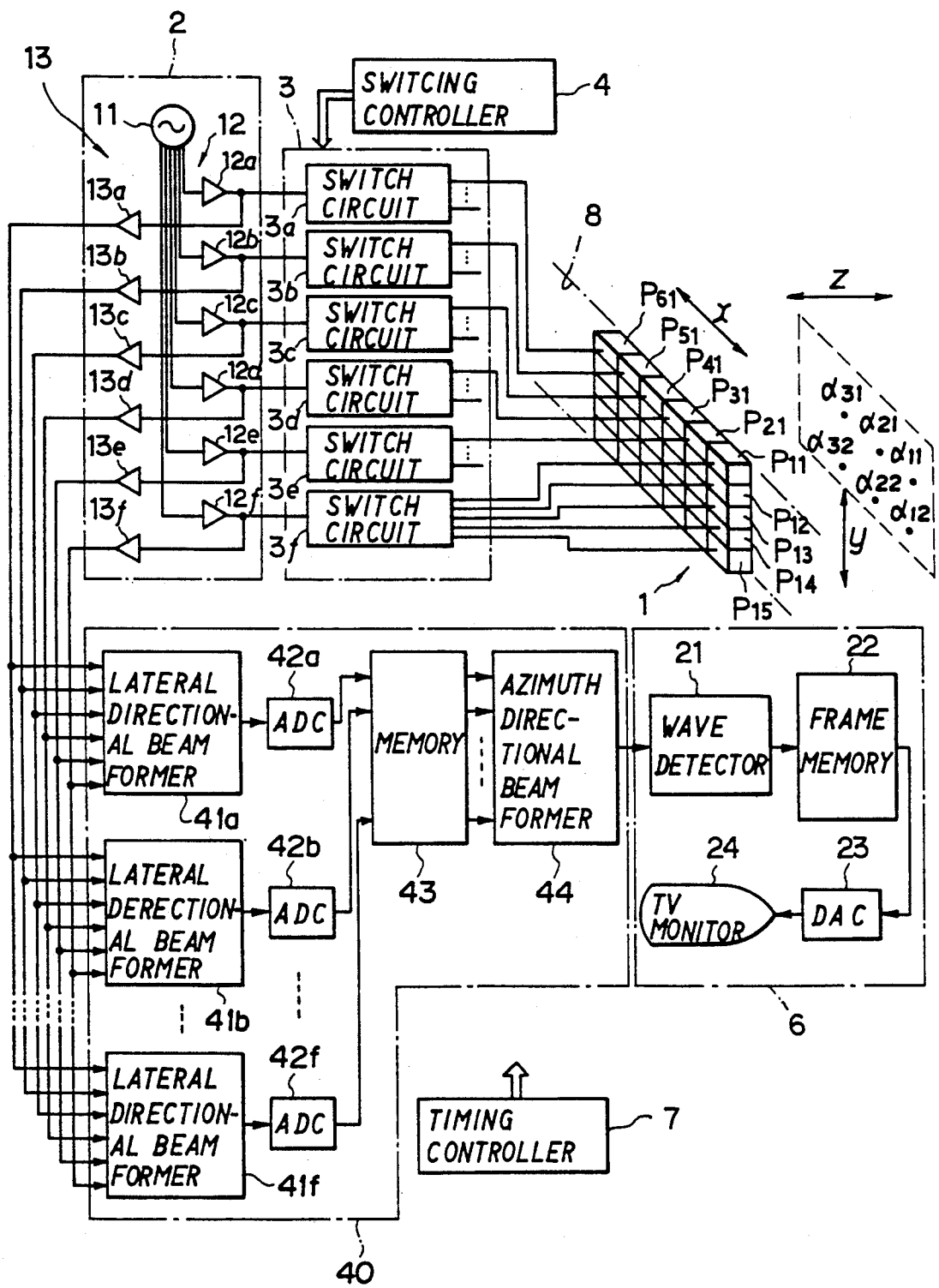
FIG. 11 is a schematic block diagram of an ultrasonic diagnostic apparatus according to a fourth embodiment of the present invention.

A signal processing portion 40 of the ultrasonic diagnostic apparatus shown in FIG. 11 has, on the input side thereof, 6 lateral directional beam formers 41a, ..., 41f serving as a first processing means. The signal processing portion 40 further comprises, on the output side thereof, A/D converters 42a, ..., 42f, a memory 43 and azimuth directional beam formers 44 serving as a second processing means. In this embodiment, a storage means is composed of the A/D converters 42a, ..., 42f and the memory 43.

Figure 12:
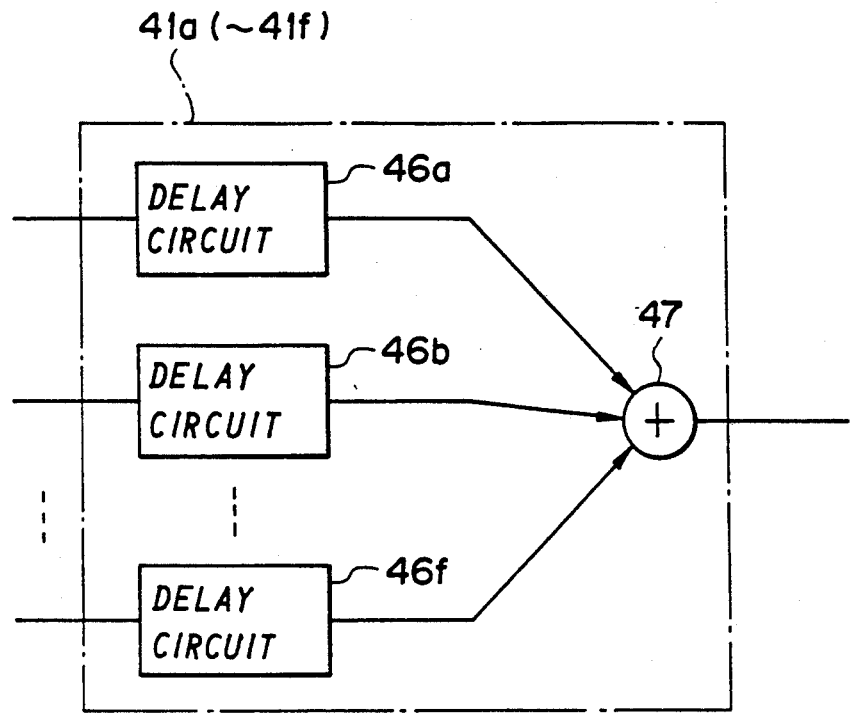
FIG. 12 is a schematic block diagram of a beam former in the fourth embodiment.
Figure 13A:
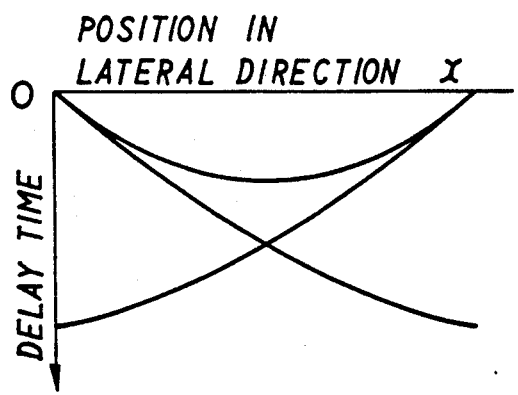
FIG. 13A represents delay time patterns in a lateral direction for plural diagnostic positions.

Each of the lateral directional beam formers 41a, ..., 41f has, as shown in FIG. 12, delay circuits 46a, ..., 46f for respectively receiving the output signals from the preamplifiers 13a, ..., 13f and an adder 47 for adding the output signals from the delay circuits 46a, ..., 46f. The delay time of the delay circuits 46a, ..., 46f is set to converge the beam to be received along a plane including the corresponding diagnostic position $\alpha_{xy}$ and perpendicular to the lateral direction x. Examples of the delay time pattern are shown in FIG. 13A.

The output signals from the lateral directional beam former 41a, ..., 41f are converted into digital signals by the corresponding A/D converters 42a (, ..., 42f) before they are stored in the memory 43. The memory 43 is capable of storing three-dimensional echo data composed of the number of the diagnostic positions $\alpha_{xy}$, the number of the transducers in the azimuth direction and the time base.

Figure 13B:
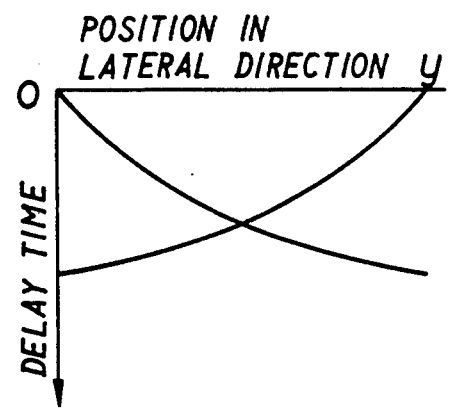
FIG. 13B represents delay time patterns in an azimuth direction for plural diagnostic positions.

The azimuth directional beam former 44 is capable of digital-processing the delay and the addition operations which are arranged to be analog-performed by the structure shown in FIG. 12. That is, the delay time of the delay circuit to be digital-processed is also set in such a manner that the beams to be received are converged along a plane including the diagnostic position $\alpha_{xy}$ and perpendicular to the azimuth direction y. Examples of the delay time pattern are shown in FIG. 13B.

The other structures are the same as those according to the first embodiment.

Figures 14A, 14B:
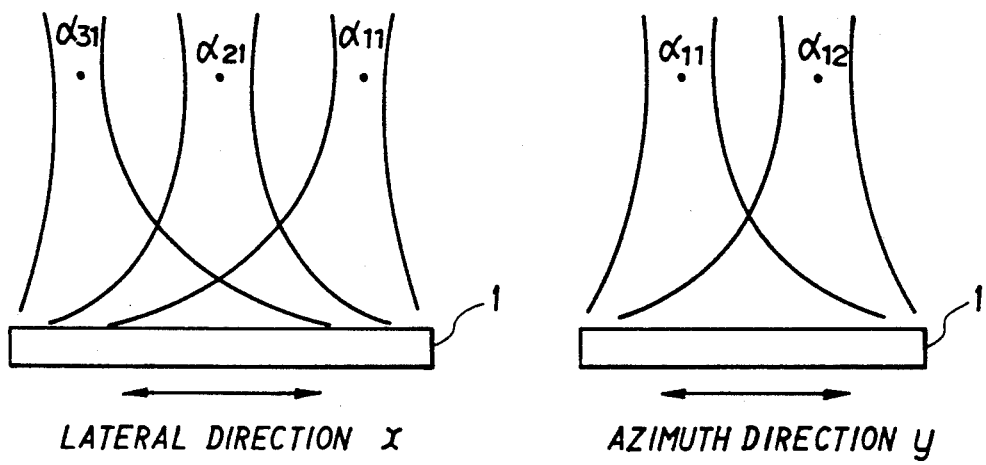
FIG. 14A represents forms of plural receiving beams in a lateral direction.
FIG. 14B represents forms of plural receiving beams in an azimuth direction.

As a result, a signal to be received and obtainable by driving the transmitting-receiving portion 2 is first beam-formed by the lateral directional beam formers 41a, ..., 41f, respectively. As a result, beams to be received as shown in FIG. 14A are formed by the calculation. Echo data generated due to forming of the above-described beam is converted into digital signals so as to be respectively stored at predetermined positions in the memory 43. After all of the regions in the memory 43 are filled with the data as a result of the operation of the probe I for a predetermined time, the stored data is read out from the azimuth directional beam former 44 so that the beam forming of each of the diagnostic position $a_{xy}$ is performed. As a result, the beams to be received and diaphragmed along the plane perpendicular to the lateral direction x are, as shown in FIG. 14B, diaphragmed along the plane perpendicular to the azimuth direction y. Therefore, the beam from each of the diagnostic position $a_{xy}$ is diaphragmed three-dimensionally. As a result, the two-dimensional slice plane in the subject to be diagnosed is scanned while maintaining a satisfactory real time responsibility.

In this embodiment, the transmitted ultrasonic wave forms a expanded beam directivity which is perpendicular to the lateral direction x, because the delay technique for transmitting beams is not utilised. As a result, the transmitting wave by respective radiations can cover the whole diagnostic positions $a_{xy}$, saving a required time for the transmission and leading to a higher real time responsibility.

According to the above-described fourth embodiment, by changing the number of the beam formers, the number of the diagnostic positions $a_{xy}$ on the slice plane can easily be changed. Furthermore, even if the same beam formers are used, the position to be diagnosed can easily be changed by changing the delay time pattern. In addition, even if a plurality of positions to be diagnosed are arranged in the lateral direction x or the azimuth direction y, they can be easily diagnosed by changing the number of the beam formers.

Figure 15:
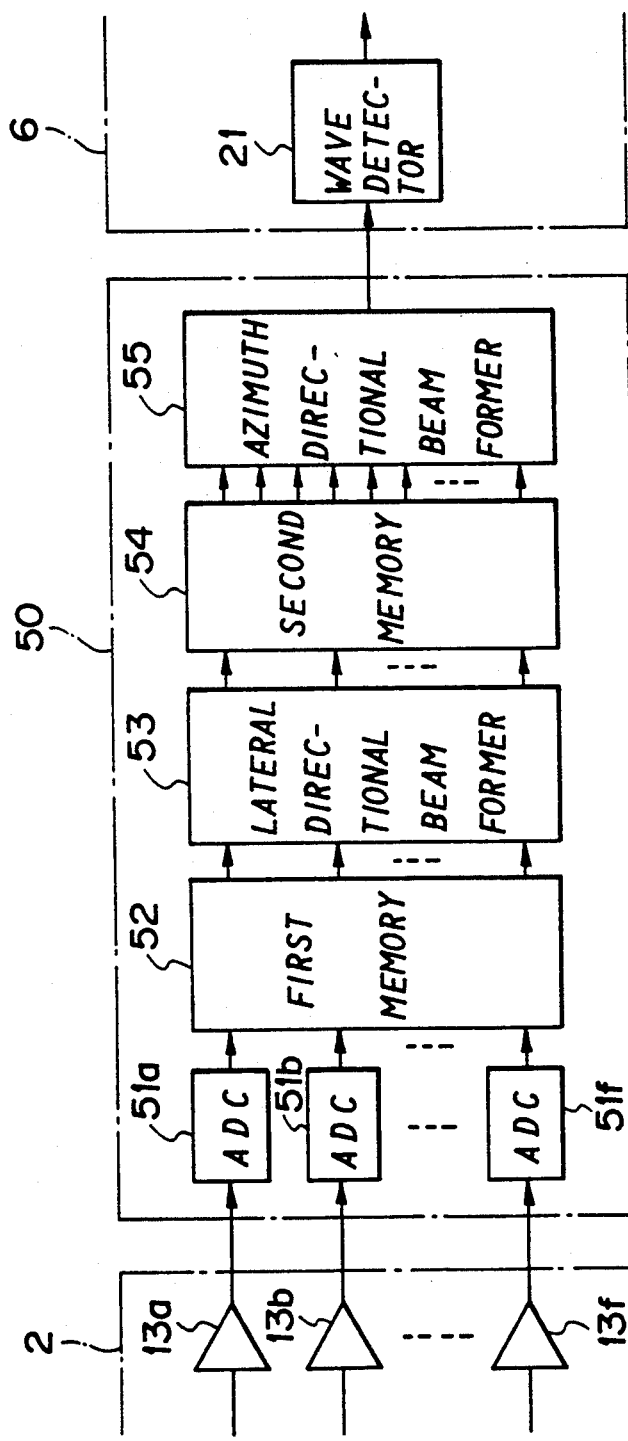
FIG. 15 is a schematic block diagram of a signal processing portion in a modified embodiment of the fourth embodiment.

In a case where overall portion of the signal processing portion 40 according to the fourth embodiment of the present invention is digitized, a structure shown in FIG. 15 is constituted. That is, the digitized signal processing portion 50 comprises an A/D converters 51a, . . . , 51f for respectively converting the output signals from the preamplifiers 13a, . . . , 13f of the transmitting-receiving portion 2 into digital signals. The processing portion 50 further comprises a first memory 52 for storing signals converted by the A/D converters 51a, . . . , 51f. The processing portion 50 further comprises a lateral directional beam former 53 for reading data stored in the memory 52 and performing the lateral directional beam forming. The processing portion 50 further comprises a second memory 54 for storing data about the result of the addition performed by the beam former 53. Furthermore, the processing portion 50 comprises an azimuth directional beam former 55 for reading data stored in the memory 54 and performing azimuth directional beam forming. The two beam formers 53 and 55 perform the beam forming by a time-division manner in accordance with the plurality of diagnostic positions so that an effect obtainable from the fourth embodiment can be obtained. In this embodiment, the second memory 54 serves as a storage means. A first processing means is composed of the A/D converters 51a, . . . , 51f, the memory 52 and the lateral directional beam former 53. A second processing means is served by the azimuth directional beam former 55.

Figure 16:
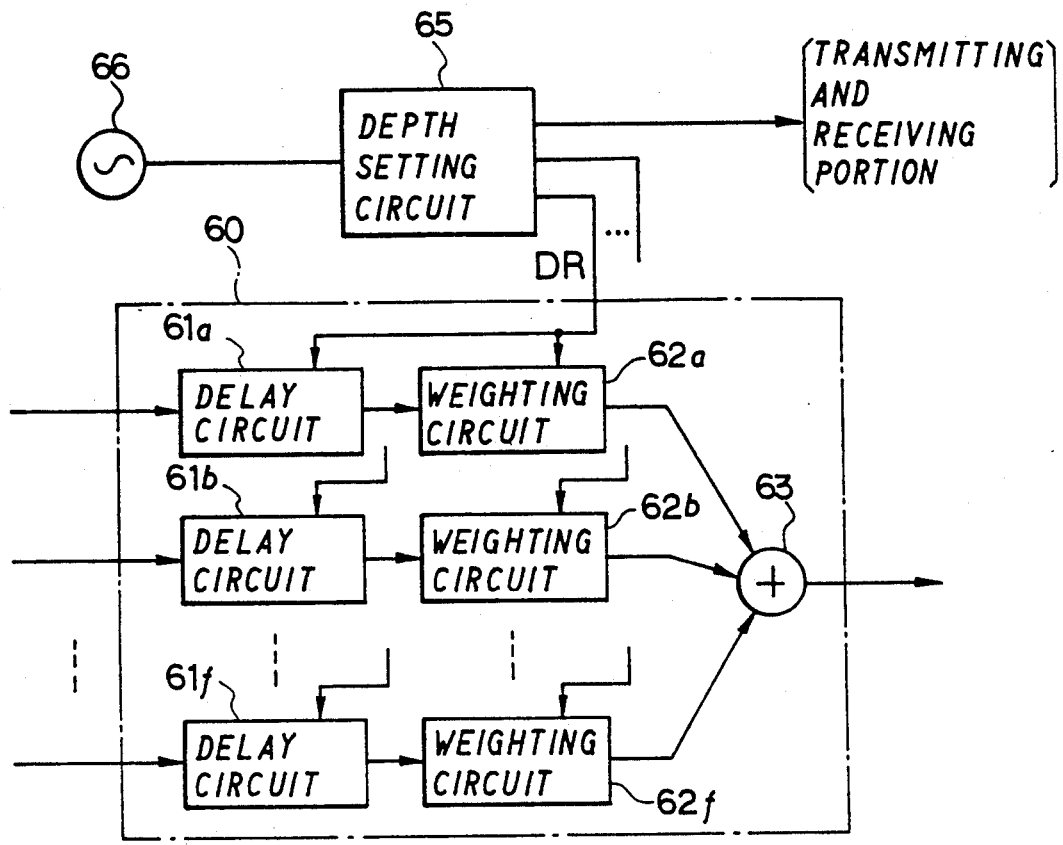
FIG. 16 is a schematic block diagram of a beam former in another embodiment.
Figure 17:
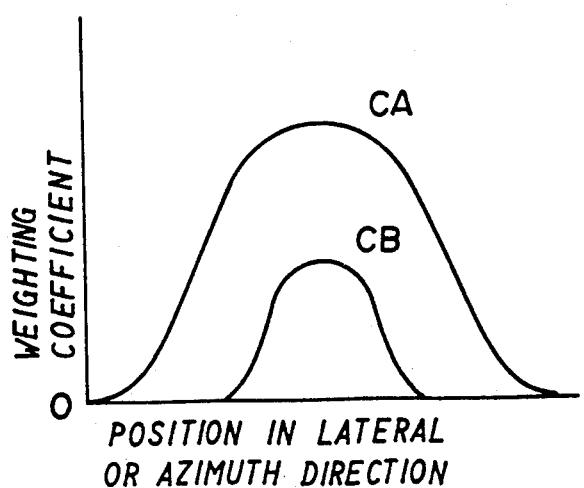
FIG. 17 shows weighting coefficient patterns for different depths to be diagnosed.

Although the beam formers in the lateral and azimuth directions according to the above-described embodiments are constituted by only the delay circuit and the adder, a structure may be additionally provided, for at least one beam former, which is capable of changing the aperture time-dependently in accordance with the depth of the subject to be diagnosed. That is, as shown in FIG. 16, a beam former 60 comprises a plurality of delay circuits 61a, . . . , 61f for receiving an echo signal, weighting circuits 62a, . . . , 62f respectively provided on the output side of each of the delay circuits 61a, . . . , 61f and adder 63 for adding the output signals from the weighting circuits 62a, . . . , 62f. The delay circuits 61a, . . . , 61f are capable of changing the delay time in response to a delay control signal DR transmitted from a depth setting circuit 65. The weighting circuits 62a, . . . , 62f are capable of changing the weighting coefficients in response to the delay control signal DR, values of each point on the weighting coefficient curves in FIG. 17 corresponding to the positions of the transducers in the lateral direction x or the azimuth direction y. The depth setting circuit 65, serving as a depth signal generating means, outputs the delay control signal DR formed by utilizing the reference pulse signal transmitted from a reference signal generator 66, the depth setting circuit 65 further transmitting an exciting pulse signal to the transmitting-receiving portion 2. In a case where a deep subject is diagnosed, the aperture area can be widened by setting the weighting coefficients of the weighting circuits 62a, . . . , 62f as designated by curve CA shown in FIG. 17. In a case where a shallow subject is diagnosed, the aperture area can be narrowed by setting the above-described weighting coefficients a designated by curve CB shown in FIG. 17. As a result, the aperture area can be controlled in accordance with the focal position of the beam so as to eliminate the influence of side lobes of the beam. In addition, even if the depth of the subject to be diagnosed is different, a receipt region having an excellent directivity can be set.

The beam forming process in the above-described embodiments may be performed with the other processing order, in which the beam forming for the azimuth direction y comes first and the beam forming for lateral direction x comes last, the opposite way from the above-described.

The above-described embodiments may be applied to either one of a linear electronic scanning manner, a sector electronic scanning manner, or a convex electronic scanning manner.

What is claimed is:
1. An ultrasonic diagnostic apparatus for transmitting ultrasonic signals to a subject to be diagnosed and reconstructing an ultrasonic diagnostic image in response to received ultrasonic echo signals, the ultrasonic diagnostic apparatus comprising:
   a probe including a plurality of transducers arranged two dimensionally in a lateral direction and an azimuth direction thereof and being organized into a plurality of transducer lines along either each of a plurality of lateral directional lines or each of a plurality of azimuth directional lines of the probe, said transducers being capable of converting electric driving signals into the ultrasonic transmitting signals and converting the ultrasonic echo signals into electric echo signals;
   signal transmitting-receiving means for transmitting the electric driving signals to excite said transducers and for receiving the electric echo signals from said transducers, said signal transmitting-receiving means having a plurality of transmitting-receiver channels equal in number to the number of transducers arranged along either one of the lateral directional lines or one of the azimuth directional lines of the probe;

switch means for selectively connecting said transducers line by line to said transmitting-receiving channels of the signal transmitting-receiving means;

switching command means for operating said switch means to electrically connect the transducers in each of the respective transducer lines to said transmitting-receiving channels in a predetermined sequential line order;

storage means for storing the electric echo signals of all of the transducers obtained by the signal transmitting-receiving means;

processing means for delaying and adding the electric echo signals stored in the storage means so as to converge the ultrasonic echo signals onto a position to be diagnosed in said subject; and image producing means for producing the ultrasonic diagnostic image in response to said electric echo signals received from said processing means.

2. An ultrasonic diagnostic apparatus according to claim 1, wherein the transducer groups include respective pluralities of the transducers arranged along respective lateral directional lines of the probe, and said switching command means operates said switch means to operate the arranged pluralities of transducers groups in the predetermined sequential order.

3. An ultrasonic diagnostic apparatus according to claim 2, wherein said switch means comprises a plurality of switch circuits equal in number to the number of transducers arranged along the lateral directional line of the probe.

4. An ultrasonic diagnostic apparatus according to claim 3, wherein each of said switch circuit comprises a plurality of two-terminal switching elements equal in number to the number of transducers arranged along the azimuth directional line of the probe, one of the two terminals of the respective two-terminal switching elements being connectable to respective transducers arranged in the azimuth direction and the other terminal being connected to said signal transmitting-receiving means.

5. An ultrasonic diagnostic apparatus according to claim 4, wherein said signal transmitting-receiving channels are respectively connected to the other terminals of the two-terminal switching elements.

6. An ultrasonic diagnostic apparatus according to claim 1, wherein said switch means is structured to drive simultaneously two transducers symmetrically positioned with respect to a center line in either one of the lateral direction and the azimuth direction of the probe.

7. An ultrasonic diagnostic apparatus for transmitting ultrasonic signals to a subject to be diagnosed and reconstructing an ultrasonic diagnostic image in response to received ultrasonic echo signals, the ultrasonic diagnostic apparatus comprising:

a probe including a plurality of transducers arranged two dimensionally in a lateral direction and an azimuth direction thereof and being organized into a plurality of transducer lines in one of the lateral and azimuth directions, said transducers being capable of converting electric driving signals into the ultrasonic transmitting signals and converting the ultrasonic echo signals into electric echo signals;

signal transmitting-receiving means for transmitting the electric echo signals from said transducers, said transmitting-receiving means having a plurality of transmitting-receiving channels equal in number to the plurality of transducers arranged in said one of the lateral and azimuth directions;

switch means for selectively connecting said transducers line by line to said transmitting-receiving channels of the signal transmitting-receiving means;

switching command means for operating said switch means to electrically connect the transducers in each of the respective transducer lines to said transmitting-receiving channels in a predetermined sequential line order;

first processing means for delaying and adding the electric echo signals received from said signal transmitting-receiving means so as to converge said ultrasonic echo signals along a plane including a position to be diagnosed in the subject as a focal point, said plane being perpendicular to a selected one of the lateral and azimuth directions of the probe;

storage means for storing the electric echo signals of all of the transducer lines received from said first processing means;

second processing means for delaying and adding the electric echo signals stored in said storage means so as to converge said ultrasonic echo signals along a further plane including the position to be diagnosed in the subject as the focal point, said further plane being perpendicular to the direction other than said selected one of the lateral and azimuth directions of the probe; and image producing means for producing the ultrasonic diagnostic image in response to the electric echo signals received from said second processing means.

8. An ultrasonic diagnostic apparatus according to claim 7, wherein said position to be diagnosed is a single position and each of said first and second processing means comprises a delay circuit for delaying a plurality of the received electric echo signals in accordance with a single delay pattern which corresponds to the single position to be diagnosed.

9. An ultrasonic diagnostic apparatus according to claim 7, wherein a plurality of positions to be diagnosed are included in said plane and said further plane and at least one of said first processing means and second processing means comprises a delay circuit mechanism for delaying the received electric echo signals in accordance with a plurality of delay patterns which correspond to the plurality of positions to be diagnosed and an adder for adding the electric echo signals received from said delay circuit mechanism.

10. An ultrasonic diagnostic apparatus according to claim 9, wherein said delay circuit mechanism is composed of a plurality of delay circuits equal in number to the plurality of said positions to be diagnosed.

11. An ultrasonic diagnostic apparatus according to claim 7, further comprising:

depth signal generating means for generating a depth signal to be measured which varies with measuring time; and at least one or each of said first processing means and said second processing means includes a delay circuit mechanism for delaying the received echo signals in accordance with a delay pattern which changes with the depth signal from said depth signal generating means.

12. An ultrasonic diagnostic apparatus according to claim 7, further comprising:
depth signal generating means for generating a depth signal to be measured which varies with measuring time; and
at least one of the first processing means and second processing means including a delay circuit mechanism for delaying the received electric echo signals in accordance with a delay pattern which changes with the depth signal from said depth signal generating means and a weighting circuit mechanism for weighting the electric echo signals received from the delay circuit mechanism in accordance with a weighting coefficient pattern which changes with the depth signal from said depth signal generating means.

* * * * *

UNITED STATES PATENT AND TRADEMARK OFFICE
CERTIFICATE OF CORRECTION

PATENT NO. : 5,186,175
DATED : February 16, 1993
INVENTOR(S) : Makoto Hirama et al.

It is certified that error appears in the above-identified patent and that said Letters Patent is hereby corrected as shown below:

Abstract, Title Page, line 2, change "is" to --are--.
Abstract, Title Page, line 4, change "lateral and azimuth directions." to --lateral and azimuth.--.
Abstract, Title Page, line 5, change "each" to --the--.
Abstract, Title Page, line 13, change "three-dimension" to --three-dimensional--.
Abstract, Title Page, line 19, change "devided" to --divided--. and "stage" to --stages--.
Abstract, Title Page, line 21, change "lead" to --leads--.
Abstract, Title Page, line 22, change "the both direction" to --both directions--.
Title Page, Foreign Application Priority Data, change "Japanese Patent Application No. 2-166638" to --Japanese Patent Application No. 3-166638--.
Claim 2, column 13, line 27, change "transducers" to --transducer--.

UNITED STATES PATENT AND TRADEMARK OFFICE
CERTIFICATE OF CORRECTION

PATENT NO. : 5,186,175
DATED : February 16, 1993
INVENTOR(S) : Makoto Hirama, et. al.

It is certified that error appears in the above-indentified patent and that said Letters Patent is hereby corrected as shown below:

Claim 4, column 13, line 35, change "circuit" to --circuits--.

Signed and Sealed this

Fifteenth Day of March, 1994

Attest:

BRUCE LEHMAN

Attesting Officer    Commissioner of Patents and Trademarks